Dec. 3, 1935.  J. A. LAVALLEE  2,023,086
WELDING APPARATUS
Original Filed Jan. 11, 1934    2 Sheets-Sheet 1

WITNESSES:

INVENTOR
J. Aime Lavallee.
ATTORNEY

Dec. 3, 1935.　　　　J. A. LAVALLEE　　　　2,023,086
WELDING APPARATUS

Original Filed Jan. 11, 1934　　2 Sheets-Sheet 2

WITNESSES:
E. A. M'Closkey.
R R Lockwood

INVENTOR
J. Aime Lavallee.
BY M. Crawford
ATTORNEY

Patented Dec. 3, 1935

2,023,086

UNITED STATES PATENT OFFICE 2,023,086

WELDING APPARATUS

Joseph Aime Lavallee, Springfield, Mass., assignor to Westinghouse Electric & Manufacturing Company, East Pittsburgh, Pa., a corporation of Pennsylvania Original application January 11, 1934, Serial No. 709,129. Divided and this application April 2, 1935, Serial No. 14,238

5 Claims. (Cl. 219—4)

My invention relates generally to electric welding and it has particular relation to butt welding.

This application is a division of application Serial No. 709,129, filed January 11, 1934 and assigned to the assignee of this application.

The metal from which transformer laminations are punched comes from the rolling mill in the form of sheets having a thickness in the neighborhood of .014 inch and in certain instances a width of 40 inches and a length of 120 inches. While the sheets, from which the laminations are punched, are supplied from the steel mill in other sizes, the thickness thereof remains approximately the same.

When the transformer laminations are punched from these short strips, it has been found that a considerable waste of material results because of the fact that the punchings are not of such shape as to permit the use of the entire strip. In the past in order to obviate this waste the individual sheets have first been welded together along the narrower dimension and then have been wound on reels in the form of a relatively long and flexible sheet or strip. It is then possible to punch the laminations from the long sheet thus formed and to reduce the waste which would be otherwise entailed to a considerable extent.

So far as I am aware, two methods have been provided in the prior art for welding the steel sheets together. The first of these methods may be termed the lap welding method in which the ends are slightly overlapped from one-quarter to three-eighths of an inch and a pair of roller electrodes of cylindrical shape are moved along the upper and lower surfaces of the joint thus formed while being energized from a source of welding current to effect a lap weld along the joint. The second method comprises the serrating of the edges of the sheets and positioning them in abutting relation with the serrations interfitting with each other. The cylindrical seam welding electrodes, as used for the lap welding operation, are moved along the joint thus formed and energized from a welding current source to perform the welding operation.

The lap welding method has several disadvantages. The first of these comprises the loss of material which is required in order to provide the lap between the ends being welded. A more serious objection, however, is involved when the laminations including a section of the lap joint are assembled in the transformer. It will be readily understood that the stacking factor will be increased as a result of the lap joint, and consequently, the size of the transformer must necessarily be increased in order to provide for a given amount of iron for the core. It will thus be seen that the use of the lap joint is not only expensive from a material standpoint but it is also a factor to be considered from the standpoint of design of the transformer. When it is appreciated that many thousands of these joints are used in the manufacture of laminations for transformers, it will be realized that the additional expense incurred through the use of the lap joint will be quite considerable.

When a joint of the serrated type is used, the stacking factor of the iron in the transformer will not be appreciably affected. However, this method of welding entails a certain amount of wastage due to the material which must be removed in order to form the serrations. Further, it is necessary to provide very accurate dies for cutting the edges in the serrated form so that they may be joined together. Due to the particular kind of metal which is used for making transformer laminations, it will be readily understood that the wear on the dies will be considerable. A more serious objection to this method of welding, however, is that it is a relatively slow process, the feet per minute which may be welded being about one-sixth that which may be welded by the lap welding process.

It will be understood that the best method from all considerations for joining the ends of the sheets together is to butt weld them. However, as far as I am aware, this process of welding has never been attempted where it has been necessary to weld sheets having such a small thickness as those which are used for transformer lamination material. As has been set forth hereinabove, the usual thickness of this material is .014 inch which is about the thickness of 5 or 6 sheets of ordinary writing paper. To butt weld such thin sheets with the method known in the prior art is impossible.

The problem then is to provide for butt welding the extremely thin sheets of material in such manner as will not increase the thickness of the sheets and thereby increase the stacking factor, and further, to provide a sufficiently strong joint so that the sheets, after they are welded, may be wound on a reel and unwound therefrom for the punching operation. If any of the methods of the prior art are used, it will be found that the abutting ends of the sheets will buckle and burn or both, due to the fact that it is necessary to weld such thin material along a relatively long joint.

The object of my invention generally stated is to provide apparatus for butt welding thin metallic sheets which shall be simple and efficient in operation and which may be readily and economically manufactured and installed.

The principal object of my invention is to provide for butt welding metal sheets or blanks.

Another important object of my invention is to provide for butt welding metal sheets having a thickness of about .014 inch.

A further object of my invention is to provide for forming a butt weld between relatively thin metal sheets or blanks under electric heat and pressure.

Other objects of my invention will in part be obvious and in part appear hereinafter.

My invention accordingly is disclosed in the embodiment hereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description taken in connection with the accompanying drawings, in which Figure 1 is a view in top plan of a butt welding machine embodying my invention;

Figure 1:
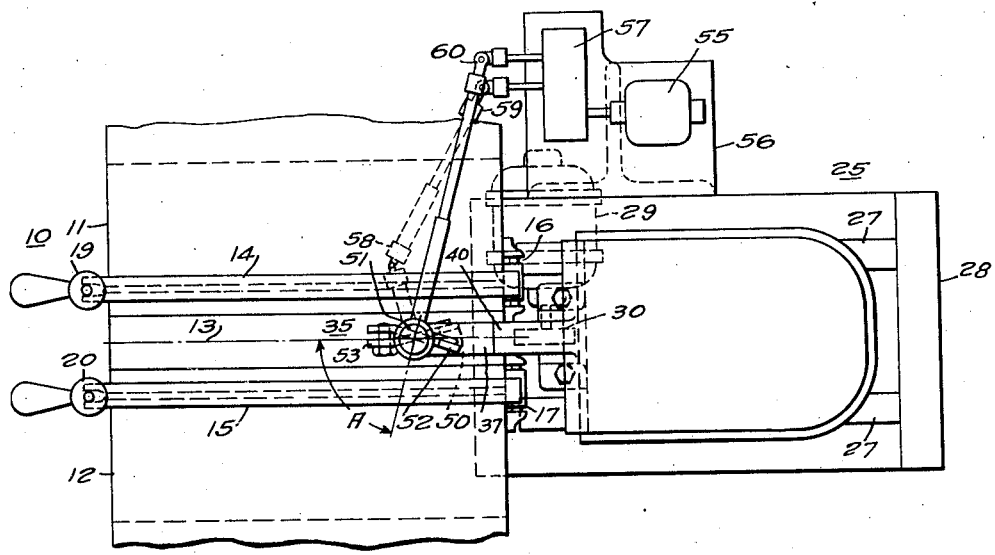
Figure 2:
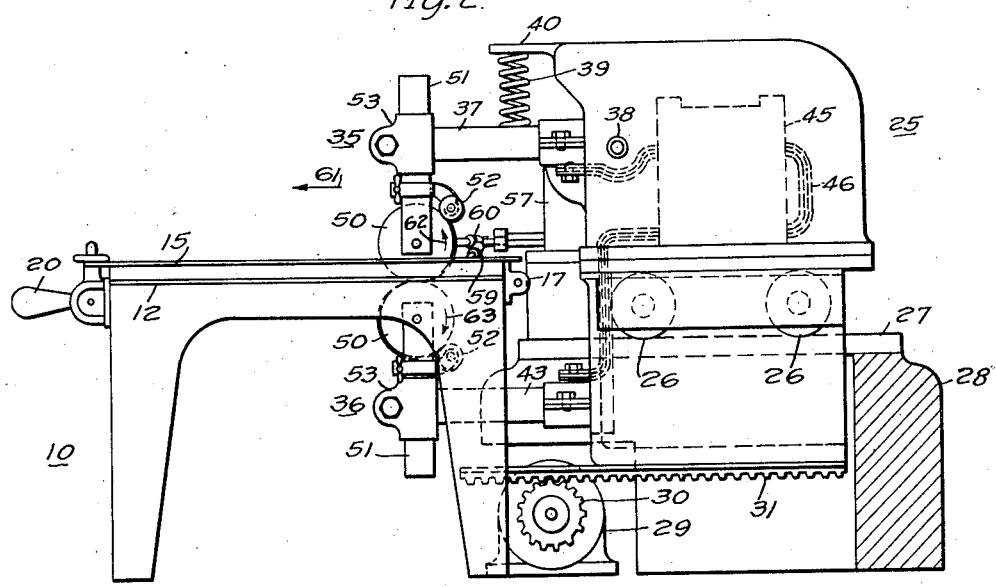
Fig. 2 is a view in side elevation of the apparatus illustrated in Fig. 1.
Figure 3:
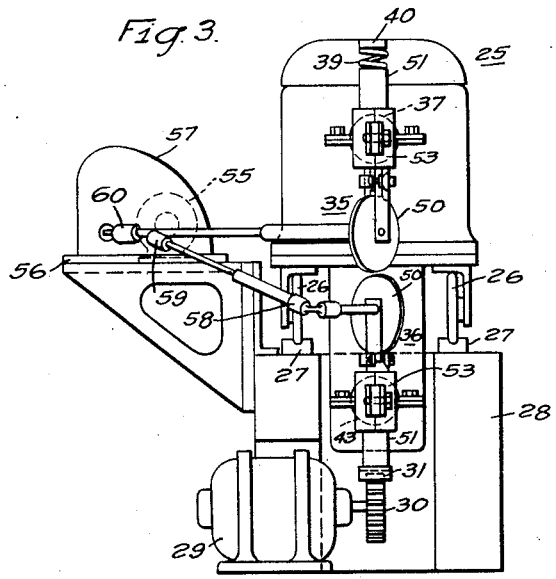
Fig. 3 is a view in front elevation of the apparatus shown in Fig. 1, the table for holding the sheets to be welded being omitted.
Figure 4:
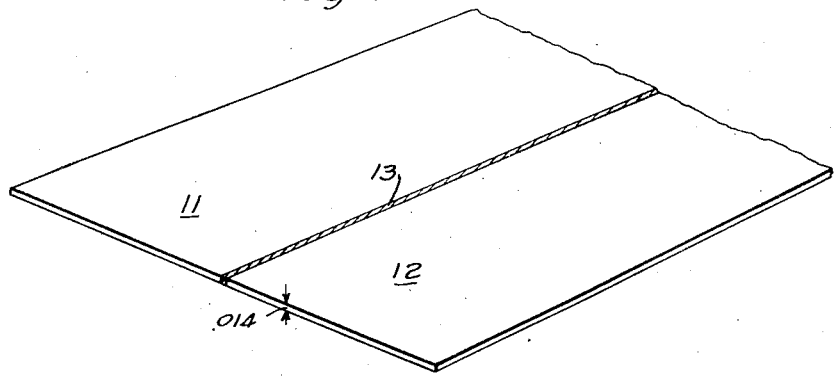
Fig. 4 is a perspective view of a portion of the sheets between which a butt weld has been made.

Referring now particularly to Figs. 1 and 2 of the drawings, the reference character 10 designates generally a table for supporting the abutting ends of two sheets 11 and 12 which are to be butt welded together. It is essential that the abutting ends of the sheets 11 and 12 be fairly accurately aligned so that the joint 13 to be welded therebetween may be made. In general, I have found it desirable to have the edges of the sheets clamped together to within .003 of an inch.

In order to hold the edges of the sheets 11 and 12 in the desired abutting relation, clamping strips 14 and 15 may be provided and hinged at the right hand end thereof at 16 and 17, as illustrated. Clamping arms 19 and 20 are provided to engage the bifurcated ends of the clamping strips 14 and 15 as illustrated in order to hold them in the desired position. While the foregoing clamping arrangement has been illustrated for holding the edges of the strips 11 and 12 in abutting relation, it will be readily understood that any other type of clamping means may be provided which may be operated automatically or manually to engage and disengage the ends of the strips 11 and 12, as may be desired.

In order to perform the welding operation along the joint 13, a welding head shown generally at 25 is provided. The welding head 25 may be mounted on rollers 26 which are arranged to traverse guide members 27 mounted on a base 28, as illustrated. In order to move the welding head 25 in a longitudinal direction, a motor 29 is provided for driving a gear wheel 30 which is positioned in driving engagement with a rack 31 carried by the welding head 25.

As illustrated, the welding head 25 is provided with upper and lower electrodes shown generally at 35 and 36, respectively. The upper electrode is mounted on a suitable electrode arm 37 and is arranged to be pivoted at 38, Fig. 2. A compression spring 39 may be positioned between the electrode arm 37 and an arm 40, which may be formed integrally with the welding head 25, for biasing the electrodes 35 and 36 into engagement with the abutting edges of the sheets 11 and 12 along the joint 13.

The lower electrode 36 is mounted by means of an electrode arm 43 but is preferably rigidly mounted, as illustrated, on the welding head 25.

A transformer shown generally at 45 is provided having a secondary winding 46, the terminals of which are connected to the upper and lower electrode arms 37 and 43, as illustrated. The transformer 45 is provided with a suitable primary winding which may be connected to any suitable source of alternating current as will be readily understood.

Each of the electrodes 35 and 36 comprises a roller electrode 50 which is carried by electrode support members 51 positioned and secured, as illustrated, in the upper and lower electrode arms 37 and 43 respectively.

In order to remove irregularities from the peripheries of the roller electrodes 50 and to maintain a true circular surface, a dressing wheel 52 is provided individual to each of them. The dressing wheels 52 may be of any suitable abrasive type that will maintain the peripheries of the roller electrodes 50 in the desired condition. The cross-sectional shape of the periphery of the roller electrodes 50 is preferably circular and the dressing wheels 52 are correspondingly shaped to maintain the circular shape.

I have discovered that a suitable butt weld may be made along the joint 13 between the abutting edges of the sheets 11 and 12 by positioning the roller electrodes 50 at some angle less than 90° to the joint 13. Referring particularly to Fig. 1 of the drawings, the angle A between the joint 13 and the horizontal axis of the upper roller electrode 50 is preferably about 87½ degrees. The electrode support members 51, carrying the roller electrodes 50 may be secured in any desired position by means of clamping members 53. When the roller electrodes 50 are moved along the joint, as the welding head 25 is moved by the motor 29, and the transformer 45 is energized, a certain kneading action takes place along the abutting edges of the joint 13 as the metal is heated by the electric current so that a high degree of fusion results between these abutting edges.

However, I have found that it is desirable to provide for independently rotating the roller electrodes 50 for the reason that the abutting edges of the sheets 11 and 12 may be caused to buckle and distort if this means is not provided due to the relative thinness of the material to be welded. It will be understood that the spring 39 causes a considerable pressure to be exerted on the abutting edges of the sheets 11 and 12 and, since the roller electrodes 50 are positioned at oppositely inclined angles relative to the joint 13, a certain tearing action would be present.

In order to provide for independently driving the roller electrodes 50, a motor 55 is provided which may be carried on a suitable shelf 56 formed integrally with the welding head 25. The motor 55 may be connected to drive the roller electrodes 50 through a suitable set of reduction gears shown generally at 57. The torque delivered from the gear box 57 may be transmitted to the roller electrodes 50 by means of suitable connections including universal joints 58, 59 and 60, as shown.

In operation, the edges of the sheets 11 and 12 are clamped in abutting relation by means of the clamping devices set forth hereinbefore. The oppositely inclined roller electrodes 50 are caused to engage the right hand end of the joint 13 so that they will be tangential thereto and pressed firmly into engagement therewith by means of the compression spring 39. The transformer 45 is energized so that current flows between the roller electrodes 50 and through the edges of the sheets 11 and 12. Motors 29 and 55 are energized to simultaneously propel the welding head 25 in the direction indicated by the arrow 61 (Fig. 2) and to rotate the roller electrodes 50 in the directions indicated by the arrows 62 and 63 (Fig. 2).

As the result of the flow of current, the abutting edges of the sheets 11 and 12 will be softened and, due to the opposite angular positioning of the roller electrodes 50, this softened metal will be kneaded together as the roller electrodes 50 are moved along the joint 13 when the welding head 25 is driven by the motor 29. Due to the fact that the roller electrodes 50 are independently rotated by means of the motor 55, the abutting edges of the sheets 11 and 12 are not distorted in any way and a weld is obtained which is practically as strong as the parent metal and at the same time, the original thickness of the sheets 11 and 12 along the joint 13 is not increased.

I have found, when the welding apparatus, hereinbefore described is used, that the welding operation may be performed at relatively high speeds. The welding speed obtainable is approximately that used in performing the lap welding operation which is in the neighborhood of 60 feet per minute.

Since certain further changes may be made in the above construction and different embodiments of the invention may be made without departing from the scope thereof, it is intended that all matters contained in the above description or shown in the accompanying drawings shall be interpreted as illustrative and not in a limiting sense.

I claim as my invention:

1. Apparatus for butt welding metal blanks or the like comprising, in combination, means for holding the edges of the blanks to be welded in abutting relation, a pair of rollers angularly disposed relative to each other and positioned above and below the joint between said edges, circuit means for connecting said rollers to a current source, means for continuously driving said rollers, and means for moving said rollers and said blanks relative to each other along said joint.

2. Apparatus for butt welding relatively thin sheets of metal or the like comprising, in combination, means for holding the edges of the sheets to be welded in abutting relation, a pair of roller electrodes disposed above and below said sheets to be welded and tangential to the joint therebetween, the axis of rotation of at least one of said roller electrodes being inclined at an angle less than 90 degrees relative to said joint, circuit means connecting said electrodes to a current source, means for continuously driving said roller electrode having the inclined axis, and means for relatively moving said electrodes and said blanks to perform the welding operation along said joint.

3. Apparatus for butt welding relatively thin sheets of metal or the like comprising, in combination, means for holding the edges of the sheets to be welded in abutting relation, a pair of roller electrodes disposed above and below said sheets to be welded and tangential to the joint therebetween, the axes of rotation of said roller electrodes being oppositely inclined at an angle less than 90 degrees relative to said joint, circuit means connecting said electrodes to a current source, means for independently and continuously driving said roller electrodes, and means for moving said electrodes and said blanks relative to each other to perform the welding operation along said joint.

4. Apparatus for butt welding relatively thin sheets of metal or the like comprising, in combination, means for holding the edges of the sheets to be welded in abutting relation, a pair of roller electrodes disposed above and below said sheets to be welded and tangential to the joint therebetween, the axes of rotation of said roller electrodes being oppositely inclined at an angle slightly less than 90 degrees relative to said joint, pressure means for forcing said electrodes into engagement with the edges of said joint, circuit means connecting said electrodes to a current source, means for independently and continuously driving said electrodes, and means for moving said electrodes along said joint.

5. Apparatus for butt welding relatively thin sheets of metal or the like comprising, in combination, means for holding the edges of the sheets to be welded in abutting relation, a pair of roller electrodes disposed above and below said sheets to be welded and tangential to the joint therebetween, the axes of rotation of said roller electrodes being oppositely inclined at an angle slightly less than 90 degrees relative to said joint, pressure means for forcing said electrodes into engagement with the edges of said joint, circuit means connecting said electrodes to a current source, means for moving said electrodes along said joint, and means for independently and continuously driving said electrodes to rotate them in the same direction in which they would rotate if they were not driven.

J. AIME LAVALLEE.